United States Patent
Tan et al.

(10) Patent No.: US 6,314,469 B1
(45) Date of Patent: Nov. 6, 2001

(54) MULTI-LANGUAGE DOMAIN NAME SERVICE

(75) Inventors: Tin-Wee Tan, Singapore (SG); Ching Hong Seng, Johor (MY); Juay Kwang Tan, Singapore (SG); Kok Yong Leong, Singapore (SG); Don Irwin Tracy De Silva, Singapore (SG); Kuan Siong Lim, Singapore (SG); Edward S. Tay, Singapore (SG); Subramanian Subbiah, Menlo Park, CA (US)

(73) Assignee: i-DNS.net International Pte Ltd, Singapore (SG)

(*) Notice: Subject to any disclaimer, the term of this patent is extended or adjusted under 35 U.S.C. 154(b) by 0 days.

(21) Appl. No.: 09/258,690

(22) Filed: Feb. 26, 1999

(51) Int. Cl.[7] .......................... G06F 15/16; G06F 15/173
(52) U.S. Cl. ........................ 709/245; 709/223; 709/225; 709/227; 709/228; 709/238; 704/8; 704/9; 707/10; 707/100; 707/542
(58) Field of Search .................................. 709/227, 228, 709/238, 245, 225, 223; 704/8, 9; 707/10, 100, 542; 345/467, 469; 370/351, 352, 353, 354, 475

(56) References Cited

U.S. PATENT DOCUMENTS

| | | | |
|---|---|---|---|
| 5,784,069 | * 7/1998 | Daniels et al. | 345/467 |
| 5,784,071 | * 7/1998 | Tang et al. | 345/467 |
| 5,793,381 | 8/1998 | Edberg et al. | |
| 6,104,711 | * 8/2000 | Voit | 370/352 |
| 6,108,703 | * 8/2000 | Leighton et al. | 709/226 |
| 6,131,095 | * 10/2000 | Low et al. | 707/10 |
| 6,161,008 | * 12/2000 | Lee et al. | 455/414 |
| 6,182,119 | * 1/2001 | Chu | 709/206 |
| 6,182,148 | 1/2001 | Tout . | |

FOREIGN PATENT DOCUMENTS

99/19814  4/1999  (WO)  .............. G06F/17/28

OTHER PUBLICATIONS

Product Description of NeoCor Tech's text translation software. As early as May 31, 1996.

The Unicode Standard, A Technical Introduction, Jun. 1998.

James Seng, International DNS (iDNS), Presentation view graphs made in Japan, Hong Kong, and China as early as Jan. 5, 1999.

Juay–Kwang Tan, et al. "iDNS, an Experiment DNS System with Unicode Support" National University of Singapore, prior to Jan. 22, 1999. (www.i–dns.com/intro.html).

M. Duerst, "Internationalization of Domain Names", Keio University, Jul. 1998. (www.i–dns.com/technical/draft–duerst–dns–i18n–02.txt).

* cited by examiner

Primary Examiner—Zarni Maung
Assistant Examiner—Saleh Najjar
(74) Attorney, Agent, or Firm—Beyer Weaver & Thomas, LLP

(57) ABSTRACT

A multilingual Domain Name System allows users to use Domain Names in non-Unicode or ASCII encodings. An international DNS server (or iDNS server) receives multilingual DNS requests and converts them to a format that can be used in the conventional Domain Name System. When the iDNS server first receives a DNS request, it determines the encoding type of that request. It may do this by considering the bit string in the top-level domain (or other portion) of the Domain Name and matching that string against a list of known bit strings for known top-level domains of various encoding types. One entry in the list may be the bit string for ".com" in Chinese BIG5, for example. After the iDNS server identifies the encoding type of the Domain Name, it converts the encoding of the Domain Name to Unicode. It then translates the Unicode representation to an ASCII representation conforming to the universal DNS standard. This is then passed into a conventional Domain Name System, which recognizes the ASCII format Domain Name and returns the associated IP address.

16 Claims, 8 Drawing Sheets

| TIME TO LIVE | MIN. CODE RESOLVING STRING | AUTHORITY | ENCODING | TRANSFORM | COMMENTS |
|---|---|---|---|---|---|
| 604800 | R9ABSBBE | .i-dns.com | GB | UTF-5 | .com (in Chinese) GB |
| 302400 | Q4BDQ571 | .i-dns.com | Big5 | UTF-5 | .com (in Chinese) |
| 57600 | R2F1RCD2 | .nic.net.jp | EUC | UTF-5 | .com (in Japanese) |
| 1209600 | O9EF0ED0 | .nic.net.jp | Shift-JIS | UTF-5 | .com (in Japanese) |
| 0 | COM | . | ASCII | ASCII | .com (in English) |
| 7200 | R971R66C.Q4BDQ571 | .nic.net.sg | Big5 | UTF-8 | .email.com (in Chinese) |

MULTI-LANGUAGE DOMAIN NAME SERVICE

BACKGROUND OF THE INVENTION

The present invention relates to the Domain Name Service used to resolve network domain names into corresponding network addresses. More particularly, the invention relates to an alternative or modified Domain Name Service that accepts domain names provided in many different encoding formats, not just ASCII.

The Internet has evolved from a purely research and academic entity to a global network that reaches a diverse community with different languages and cultures. In all areas the Internet has progressed to address the localization needs of its audience. Today, electronic mail is exchanged in most languages. Content on the World Wide Web is now published in many different languages as multilingual-enabled software applications proliferate. It is possible to send an e-mail message to another person in Chinese or to view a World Wide Web page in Japanese.

The Internet today relies entirely on the Domain Name System to resolve human readable names to numeric IP addresses and vice versa. The Domain Name System (DNS) is still based on a subset of Latin-1 alphabet, thus still mainly English. To provide universality, e-mail addresses, Web addresses, and other Internet addressing formats adopt ASCII as the global standard to guarantee interoperation. No provision is made to allow for e-mail or Web addresses to be in a non-ASCII native language. The implication is that any user of the Internet has to have some basic knowledge of ASCII characters.

While this does not pose a problem to technical or business users who, generally speaking, are able to understand English as an international language of science, technology, business and politics, it is a stumbling block to the rapid proliferation of the Internet to countries where English is not widely spoken. In those countries, the Internet neophyte must understand basic English as a prerequisite to send e-mail in her own native language because the e-mail address cannot support the native language even though the e-mail application can. Corporate intranets have to use ASCII to name their department domain names and Web documents simply because the protocols do not support anything other ASCII in the domain name field even though filenames and directory paths can be multilingual in the native locale.

Moreover, users of European languages have to approximate their domain names without accents and so on. A company like Citroen wishing to have a corporate identity has to approximate itself to the closest ASCII equivalent and use "www.citroen.fr" and Mr François from France has to constantly bear the irritation of deliberately mis-typing his e-mail address as "francois@email.fr" (as a fictitious example).

Currently, user-ids in an e-mail address field can be in multilingual scripts as operating systems can be localized to provide fonts in the relevant locale. Directories and filenames too can also be rendered in multilingual scripts. However, the domain name portion of these names are restricted to those permitted by the Internet standard in RFC1035, the standard setting forth the Domain Name System.

One justifiable reason for this situation could be that software developers tended to use overlapping codes. For example, the Chinese BIG5 and GB2312 encodings (i.e., digital representations of glyphs or characters) overlap, so do the Japanese JIS and Shift-JIS and the Korean KSC5601, just to name a few. As a result, one cannot easily tell the difference between encodings of BIG5 with JIS or GB2312 with KSC5601 unless an additional parameter specifying the encoding is included to inform the application client which encoding is being used. Therefore to ensure uniqueness of domain names and certainty of encoding, DNS has stuck to ASCII.

Based on RFC1035, valid domain names are currently restricted to a subset of the ISO-8859 Latin 1 alphabet, which comprises the alphabet letters A–Z (case insensitive), numbers 0–9 and the hyphenation symbol (-) only. This restriction effectively makes a domain name support English or languages with a romanized form, such as Malay or Romaji in Japanese, or a roman transliteration, such as transliterated Tamil. No other script is acceptable; even the extended ASCII characters cannot be used.

Unicode is a character encoding system in which nearly every character of most important languages is uniquely mapped to a 16 bit value. Since Unicode has laid down the foundations for unique non-overlapping encoding system, some researchers have begun to explore how Unicode can be used as the basis for a future DNS namespace, which can embrace the rich diversity of languages present in the world today. See M. Dürst, "Internationalization of Domain Names," Internet Draft "draft-duerst-dns-i18n-02.txt," which can be found at the IETF home page, http://www.ietf.cnri.reston.va.us/ID.html, July 1998. This document is incorporated herein by reference in its entirety and for all purposes. The new namespace should be able to offer multilingual and multiscript functionality that will make it easier for non-English speakers to use the Internet.

Adopting Unicode as the standard character set for a new Domain Name System avoids overlapping code space for different language scripts. In this way, it may allow the Internet community to use domain names in their native scripts such as:

www.citroën.ch www. genève-city.ch

Unfortunately, several difficulties would preclude modifying the DNS server and client applications to implement a multilingual Domain Name System. For example, all future client applications and all future DNS servers have to be modified. As both client and server have to be modified for the system to work, the transition from the old system to the new system could be difficult. Further, very few available client applications use native Unicode. Instead, most multilingual client applications use non-Unicode encodings, and have strong followings.

In view of these and other issues, it would be highly desirable to have a technique allowing the many linguistic encodings to be used in the DNS system.

SUMMARY OF THE INVENTION

The present invention provides systems and methods for implementing a multilingual Domain Name System allowing users to use Domain Names in non-Unicode and non-ASCII encodings. While the method may be implemented in various systems or combination of systems, for now the implementing system will be referred to as an international DNS server (or "iDNS" server). When the iDNS server first receives a DNS request, it determines the encoding type of that request. It may do this by considering the bit string in the top-level domain of the Domain Name and matching that string against a list of known bit strings for known top-level domains of various encoding types. One entry in the list may be the bit string for ".com" in Chinese BIG5, for example. After the iDNS server identifies the encoding type of the Domain Name, it converts the encoding of the Domain Name to a universal linguistic encoding type (e.g., Unicode). It then translates the universal linguistic encoding type representation to an ASCII representation conforming to the universal DNS standard. This is then passed into a conventional Domain Name System, which recognizes the ASCII format Domain Name and returns the associated IP address.

One aspect of the invention provides a method of detecting the linguistic encoding type of a digitally represented domain name. The method may be characterized by the following sequence: (a) receiving the digital sequence of a prespecified portion (e.g., a top-level domain) of the digitally represented domain name; (b) matching the digital sequence from the domain name with a known digital sequence from a collection of known digital sequences; and (c) identifing an encoding type associated with the known digital sequence matching the digital sequence from the domain name. Each of the known digital sequences used in (b) is associated with a particular linguistic encoding type. Note that the collection of known digital sequences includes known digital sequences for at least two different linguistic encoding types.

It will often be convenient to provide the collection in a table containing records having attributes including known digital sequences and encoding types. In this case, identifying the encoding type requires identifying the encoding type of a record having the matching known digital sequence. Examples of encoding types represented in the table include ASCII, BIG5, GB2312, shift-JIS, EUC-JP, KSC5601, and extended ASCII.

When at least two known digital sequences match the digital sequence from the domain name, it will be necessary to resolve the ambiguity. This may be accomplished by (a) receiving the digital sequence of a second portion of the digitally represented domain name; (b) decoding the digital sequence of the second portion multiple times, each time using a decoding scheme of a different one of the linguistic encoding types, each associated with the at least two known digital sequences; and (c) identifying the decoding that gives the best result. Alternatively, the ambiguity may be resolved by first matching an extended digital sequence (including both the first and second portions of the domain name) and then matching that extended sequence against known digital sequences that may correspond to the extended sequence. In this case, the collection of known digital sequences must include some of the extended sequences.

In a specific embodiment, the collection of records include a digital sequence (or representation of a digital sequence) of a "minimum code resolving string" (MCRS). This is a digital sequence for a portion of a domain name and is known to distinguish that domain name—in a particular encoding type—from every other domain name/encoding type combination in the collection. The MCRS may be a sub-string of the top-level domain, a super-string of the top-level domain, overflow to the second and third level domains, etc., so long as ambiguity is avoided when matching takes place.

As mentioned, the method is particularly applicable to handling DNS requests. Thus. the method may also involve (i) receiving a DNS request containing the digitally represented domain name; (ii) identifying a root level DNS server responsible for resolving root level domains of the identified encoding type; and (iii) transmitting the DNS request to the root level DNS server. Prior to transmitting the DNS request, the system should convert the domain name's digital sequence from the identified encoding type to a DNS encoding type compatible with DNS protocol (e.g., ASCII or possibly Unicode or some other universal encoding in the future). In a preferred embodiment, this conversion takes place in two operations: (i) converting the domain names digital sequence from the identified encoding type to a universal linguistic encoding type; and (ii) converting the domain name's digital sequence from the universal linguistic encoding type to a DNS encoding type compatible with the DNS protocol.

This invention also provides a mapping table that associates particular linguistic encoding types with particular digital sequences. The mapping table includes a plurality of records, each including the following attributes: (a) a known digital sequence of a prespecified portion of a digitally represented domain name; and (b) a linguistic encoding type associated with the known digital sequence. The prespecified portion of the digitally represented domain name may be the digital sequence of the root level domain in the domain name. The records may also include a top level level DNS server responsible for resolving top-level level domains of the linguistic encoding type in the record. Still further, the mapping table may specify the type of transformation required to convert domain names from a non-DNS encoding type to a DNS compliant encoding type (e.g., UTF-5).

This invention also relates to an apparatus that may be characterized by the following features: (a) one or more processors; (b) memory coupled to at least one of the one or more processors; and (c) one or more network interfaces capable of receiving a first DNS request including a domain name in a non-DNS encoding type and transmitting a DNS request with the domain name in a DNS encoding type that is compatible with the DNS protocol. At least one of the one or more processors will be designed or configured to convert the domain name in the non-DNS encoding type to that domain name in the DNS encoding type. The one or more network interfaces should be coupled to a network in a manner allowing the apparatus to receive client DNS requests presenting the domain name in the non-DNS encoding type. Further, the one or more network interfaces should be coupled to the network in a manner allowing the apparatus to transmit a DNS request to a standard DNS server, with the DNS request presenting the domain name in the DNS encoding type.

The apparatus preferably also includes a mapping table (possibly like one of those described above) residing, at least in part, on the memory. Further, at least one processor should be configured or designed to identify the non-DNS encoding type of the domain name prior to converting that domain name from the non-DNS encoding type to the DNS encoding type.

These and other features and advantages of the present invention will be described in more detail below with reference to the drawings.

BRIEF DESCRIPTION OF THE DRAWINGS

FIG. 5 is an illustration of a logical mapping table used to identify encoding types of domain names in accordance with one embodiment of this invention.

DETAILED DESCRIPTION OF THE PREFERRED EMBODIMENTS

1. DNS and Unicode

Figure 1:
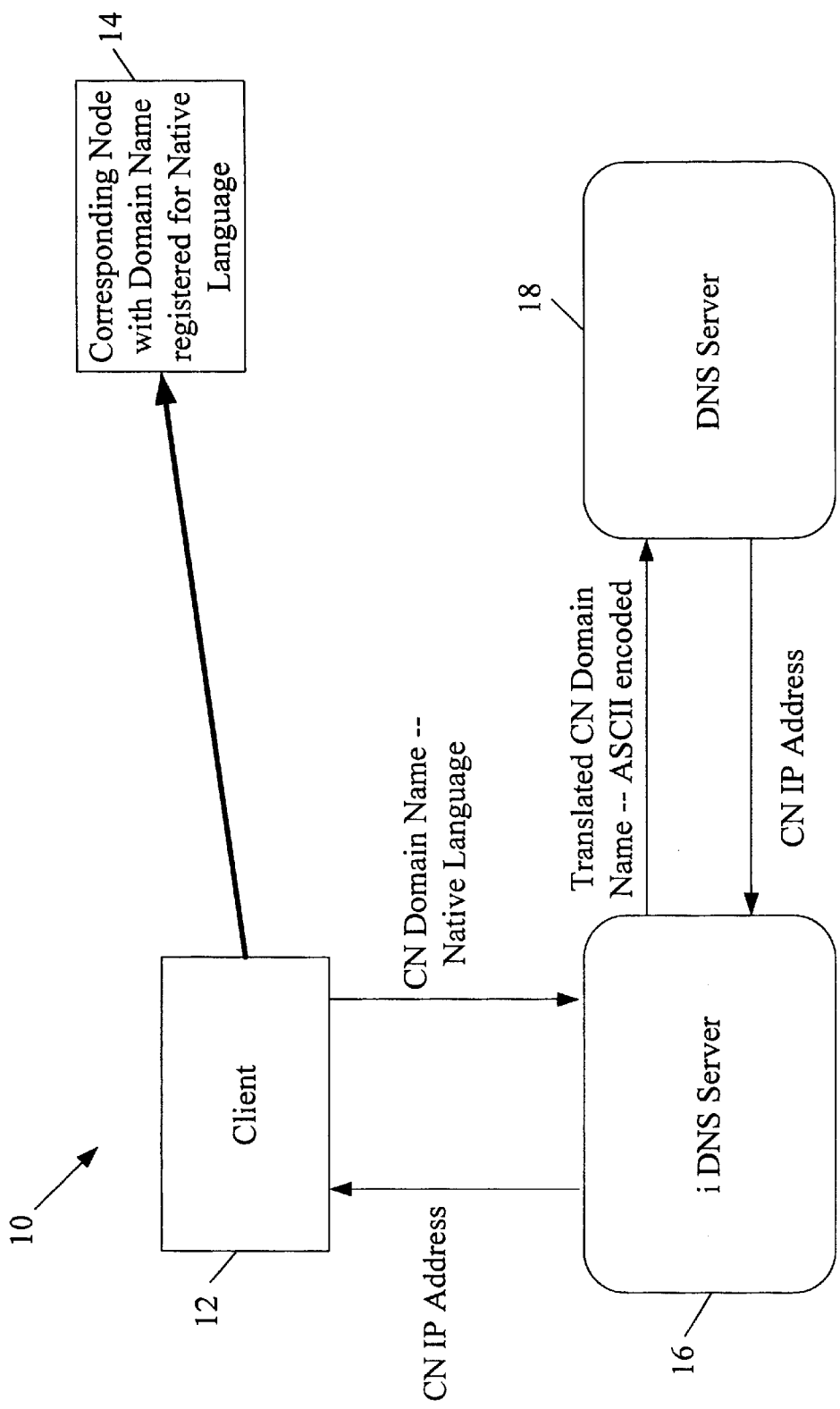
FIG. 1 is a schematic illustration of a network architecture including an iDNS server positioned between a DNS server and a client.

The present invention transforms multilingual multiscript names to a form that is compliant with DNS (e.g., DNS as explained in RFC1035 as of 1999). These transformed names may then be relayed as DNS queries to a conventional DNS server. An exemplary process of how a localized domain name is resolved to its numeric IP address is illustrated by FIG. 1 below. However, before FIG. 1 is described, a few underlying principles and terms will be discussed.

Programs rarely refer to hosts, and other resources by their binary network addresses. Instead of binary numbers, they use ASCII strings, such as www.pobox.org.sg. Nevertheless, the network itself only understands binary addresses, so some mechanism is required to convert the ASCII strings to network addresses. This mechanism is provided by the Domain Name System.

The essence of DNS is a hierarchical, domain-based naming scheme and a distributed database system for implementing this naming scheme. It is primarily used for mapping host names and e-mail destinations to IP addresses, but can be used for other purposes. As mentioned, DNS is defined in RFCs 1034 and 1035.

Very briefly, the way DNS is used is as follows. To map a name onto an IP address, an application program calls a library procedure called the "resolver," passing it the name as a parameter. The resolver sends a UDP packet to a local DNS server, which then looks up the name and returns the IP address to the resolver, which then returns it to the caller. With the IP address in hand, the program can establish a TCP connection with the destination or send it UDP packets.

Conceptually, the Internet is divided into many top-level "domains," for each domain covers many hosts. Each domain is partitioned into sub-domains and these are further partitioned, and so on. All these domains can be represented by a tree. The leaves of the tree represent domains that have no sub-domains (but do contain machines, of course). A leaf domain may contain a single host, or it may represent a company that contains thousands of hosts.

The top-level domains come in two flavors: generic and countries. The generic domains are com (commercial), edu (educational institutions), gov (the united states federal government), int (certain international organizations), mil (the united states armed forces), net (network providers), and org (organizations). The country domains include one entry for every country, as defined in ISO3166. Each domain is named by the path upward from it to the unnamed root. The components are separated by periods (pronounced "dot").

In principal, domains can be inserted into the tree in two different ways. For example, cs.ucb.edu could equally well be listed under the us. Country domain as cs.ucb.ct.us. In practice, however, nearly all organizations in the United States are under a generic domain, and nearly all outside the United States are under the domain of their country. There is no rule against registering under two top-level domains, but doing so might be confusing, so few organizations do it.

Each domain controls how it allocates the domains under it. For example, Japan has domains ac.jp and co.jp that mirror edu and com. To create a new domain, permission is required of the domain in which it will be included. For example, if an artificial intelligence group is started at the University of California at Berkeley and wants to be known as ai.cs.ucb.edu it needs permission from whomever manages cs.ucb.edu. Similarly, if a new university is chartered, say, the University of Lake Tahoe, it must ask the manager of the edu domain to assign it ulth.edu. In this way, name conflicts are avoided and each domain can keep track of all its sub-domains. Once a new domain has been created and registered, it can create its own sub-domain, such as cs.ulth.edu, without getting permission from any entity higher up in the tree.

In theory, at least, a single name server could contain the entire DNS database and respond to all queries about it. In practice, this server would be so overloaded as to be useless. Furthermore, if it ever went down, the entire Internet would be crippled. To avoid the problems associated with having only a single source of information, the DNS name space is divided into non-overlapping "zones." Each zone contains some part of the tree and also contains name servers holding the authoritative information about that zone. Normally, a zone will have one primary name server, which gets its information from a file on its disk, and one or more secondary name servers, which get their information from the primary name server.

When a resolver gets a query about a domain name, it passes the query to one of the local name servers. If the domain being sought falls under the jurisdiction of the name server, such as ai.cs.ucb.edu falling under cs.ucb.edu, it returns the authoritative resource records. An authoritative record is one that comes from the authority that manages the record, and is thus always correct. A given name server may also contain "cached records," which may be out of date.

If the domain of interest is remote and no information about the requested domain is available locally, the name server sends a query message to the top-level name server for the domain requested. For example, a local name server seeking to find the IP address for ai.cs.ucb.edu may send a UDP packet to the server for edu given in its database, eduserver.net. It is unlikely that this server knows the address of ai.cs.ucb.edu, and probably does not know cs.ucb.edu either, but it must know all of its own children, so it forwards the request to the name server for ucb.edu. In turn, this one forwards the request to cs.ucb.edu that must have the authoritative resource records. Since each request is from a client to a server, the authoritative record requested works its way back to the original name server requesting the IP address for ai.cs.ucb.edu.

Once the record gets back to the original name server, it will be entered into a cache there, in case it is needed later. However, this information is not authoritative, since changes made at cs.usb.edu will not be propagated to all the caches in the world that may know about it. For this reason, a cache entry should be removed or updated frequently. This may be accomplished with a "time_to_live" field included in each record.

The above example of a method for resolving a domain name is referred to as recursive querying. Other techniques exist. For more detail on DNS, see Andrew S. Tanenbaum, "Computer Networks," 3$^{rd}$ Ed., Prentice Hall, Upper Saddle River, N.J. (1996) from which much of the above discussion was adapted. See also U.D. Black, "TCP/IP and Related Protocols," 3$^{rd}$ Ed., McGraw-Hill, San Francisco, Calif. (1998). Both of these references are incorporated herein by reference for all purposes.

As noted, the DNS protocol is currently based upon a subset of ASCII, and is thus limited to the Latin alphabet. Numerous other encodings provide digital representations for other character sets of the world. Examples include BIG5 and GB-2312 for Chinese character scripts (traditional and simplified respectively), Shift-JIS and EUC-JP for Japanese character scripts, KSC-5601 for Korean character scripts, and the extended ASCII characters for French and German characters, for instance.

Beyond these language-specific encoding types, there exists the Unicode standard (a "universal linguistic encoding type") that provides the capacity to encode all the characters used in the written languages of the world. It uses a 16-bit encoding that provides code points for more than 65,000 characters. Unicode scripts include Latin, Greek, Cyrillic, Armenian, Hebrew, Arabic, Devanagari, Bengali, Gunnukhi, Gujarati, Oriya, Tamil, Telugu, Kannada, Malayalam, Thia, Lao, Georgian, Tibetan, Japanese Kana, the complete set of modern Korean Hangul, and a unified set of Chinese/Japanese/Korean (CJK) ideographs. Many more scripts and characters are to be added shortly, including Ethiopic, Canadian, Syllabics, Cherokee, additional rare ideographs, Sinhala, Syriac, Burmese, Khmer, and Braille.

A single 16-bit number is assigned to each code element defined by the Unicode Standard. Each of these 16-bit numbers is called a code value and, when referred to in text, is listed in hexadecimal form following the prefix "U". For example, the code value U+0041 is the hexadecimal number 0041 (equal to the decimal number 65). It represents the character "A" in the Unicode Standard.

Each character is also assigned a unique name that specifies it and no other. For example, U+0041 is assigned the character name "LATIN CAPITAL LETTER A." U+0A1B is assigned the character name "GURMUKHI LETTER CHA." These Unicode names are identical to the ISO/IEC 10646 names for the same characters.

The Unicode Standard groups characters together by scripts in code blocks. A script is any system of related characters. The standard retains the order of characters in a source set where possible. When the characters of a script are traditionally arranged in a certain order—alphabetic order, for example—the Unicode Standard arranges them in its code space using the same order whenever possible. Code blocks vary greatly in size. For example, the Cyrillic code block does not exceed 256 code values, while the CJK code block has a range of thousands of code values.

Code elements are grouped logically throughout the range of code values, called the "codespace." The coding starts at U+0000 with the standard ASCII characters, and continues with Greek, Cyrillic, Hebrew, Arabic, Indic and other scripts; then followed by symbols and punctuation. The code space continues with Hiragana, Katakana, and Bopomofo. The unified Han ideographs are followed by the complete set of modern Hangul. The surrogate range of code values is reserved for future expansion with UTF-16. Towards the end of the codespace is a range of code values reserved for private use, followed by a range of compatibility characters. The compatibility characters are character variants that are encoded only to enable transcoding to earlier standards and old implementations which made use of them.

Character encoding standards define not only the identity of each character and its numeric value, or code position, but also how this value is represented in bits. The Unicode Standard endorses at leas t three forms that correspond to ISO 10646 transformation formats, UTF-7, UTF-8 and UTF- 1 6.

The ISO/IEC 10646 transformation formats UTF-7, UTF-8 and UTF-16 are essentially ways of turning the encoding into the actual bits that are used in implementation. UTF-16 assumes 16-bit characters and allows for a certain range of characters to be used as an extension mechanism in order to access an additional million characters using 16-bit character pairs. The Unicode Standard, Version 2.0, Addison Wesley Longman (1996) (with updates and additions added via "The Unicode Standard, Version 2.1) has adopted this transformation format as defined in ISO/IEC 10646. This reference is incorporated herein by reference in its entirety and for all purposes.

The second transformation format is known as UTF-8. This is a way of transforming all Unicode characters into a variable length encoding of bytes. It has the advantages that the Unicode characters corresponding to the familiar ASCII set end up having the same byte values as ASCII, and that Unicode characters transformed into UTF-8 can be used with much existing software without extensive software rewrites. The Unicode Consortium also endorses the use of UTF-8 as a way of implementing the Unicode Standard. Any Unicode character expressed in the 16-bit UTF-16 form can be converted to the UTF-8 form and back without loss of information. The Unicode Standard specifies unambiguous requirements for conformance in terms of the principles and encoding architecture it embodies. A conforming implementation has the following characteristics, as a minimum requirement:

characters are 16-bit units;

characters are interpreted with Unicode semantics;

unassigned codes are not used; and, unknown characters are not corrupted.

UTF-8 implementations of the Unicode Standard are conformant as long as they treat each UTF-8 encoding of a Unicode character (sequence of bytes) as if it were the corresponding 16-bit unit and otherwise interpret characters according to the Unicode specification. The full conformance requirements are available within The Unicode Standard, Version 2.0, Addison Wesley Longman, 1996, previously incorporated by reference.UTF-7 is designed to provide 7 bit characters that are useful for 7 bit media/transport. Email as specified in RFC 822, for example, is a 7 bit system. UTF-16 is designed for 16 bit media/transport and UTF-8 is designed for 8 bit media/transport. Most of the Internet is 8 bit transportable, but there are legacy systems using 7 bits (e.g., DNS, SMTP email, etc.).

2. Terminology

Some of the terms used herein are not commonly used in the art. Other terms have multiple meanings in the art. Therefore, the following definitions are provided as an aide to understanding the description that follows. The invention as set forth in the claims should not necessarily be limited to these definitions.

Linguistic encoding type—any character or glyph encoding type (e.g., ASCII or BIG5) now known or used in the future.

Universal linguistic encoding type—any linguistic encoding type, now known or developed in the future, that encompasses more than one character or glyph set within its encoding. Unicode is one example. BIG5, iso-8859-11, and GB-2312 are others.

Digitally represented—the way characters are presented as a result of encoding (e.g., in a bit stream, a hexadecimal format, etc.)

Digital sequence—a particular sequence of ones and zeros, hexadecimal characters, or other constituents in a digital representation.

"Portion" of a digitally represented domain name—any section or a whole of a domain name; e.g., the top-level domain, the second level domain, and the top and second level domain together.

"Known" digital sequence—a digital sequence of interest because it is known to be associated with some commonly used character combination (or other property of domain names) encoded in a particular encoding type (e.g., the BIG5 digital sequence for ".com").

"Collection" of known digital sequences—any arrangement of or connection between multiple known digital sequences. Typically, though not necessarily, stored together logically as a table (e.g., a "mapping table" described herein).

DNS encoding type—an encoding type supported by the DNS protocol of a network or Internet, e.g., a limited set of ASCII specified in RFC 1035.

Non-DNS encoding type—an encoding type not supported by the DNS protocol under consideration, e.g., BIG5 under RFC 1035.

3. Implementations of iDNS

Turning now to FIG. 1, some important components of a network 10 used in an embodiment of this invention include a client 12, a corresponding node 14 with whom client 12 wishes to communicate, an iDNS server 16 and a conventional DNS server 18. The IDNS server 16 may listen on a DNS port (currently addressed to the domain name port 53) for multilingual domain name queries in place of a normal DNS server, which may include the Berkeley Internet Name Domain ('BIND' and its executable version 'named') which is a widely used DNS server written by Paul Vixie (http://www.isc.org/).

To understand the role of these components, assume that client 12 is used by a Chinese student who wishes to inquire about employment in a Hong Kong business that operates corresponding node 14. The student has previously communicated with the business and has obtained the domain name of that business. The domain name is provided in native Chinese characters. Client 12 is outfitted with a keyboard that can type Chinese language characters and is configured with software that can recognize encoded Chinese characters and accurately display them on a computer screen.

Now, the student prepares a message to the Hong Kong business, encloses her resume, and types in the Chinese domain name as the destination. When she instructs client 12 to send the message to corresponding node 14, the system shown in FIG. 1 takes the following actions. First, the corresponding node domain name is submitted, in the native language, to iDNS server 16 via a DNS request. The iDNS server 16 recognizes that the domain name is not in a format that can be handled by a conventional DNS server. Therefore it translates the Chinese domain name to a format that can be used with a conventional DNS server (normally a limited set of the ASCII characters). The iDNS server 16 then repackages the DNS request, with the translated corresponding node domain name, and transmits that request to conventional DNS server 18. DNS server 18 then uses the normal DNS protocol to obtain a network address for the domain name it received in the DNS request. The resulting network address is the network address of corresponding node 14. DNS server 18 packages that network address according to conventional DNS protocol and forwards the address back to iDNS server 16. The iDNS server 16, in turn, transmits the needed network address back to client 12, where it is placed in the student's message. The message is packetized, with each packet having a destination network address corresponding to node 14. Client 12 then sends the message packets over the Internet to node 14.

Figure 2:
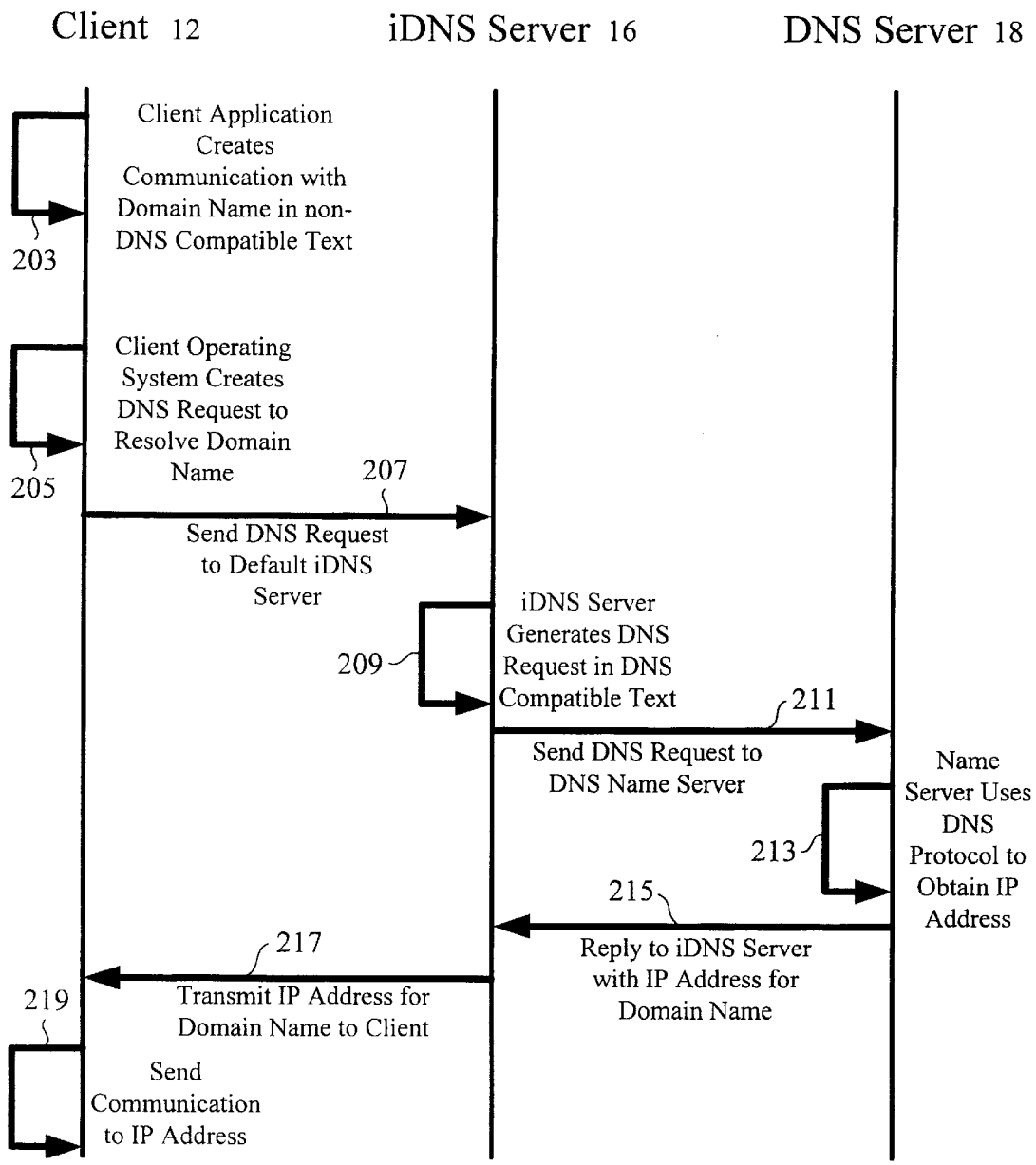
FIG. 2 is a process flow diagram depicting the resolution of a DNS request presenting a Domain Name in a non-DNS encoding type, in accordance with one embodiment of the present invention.

This procedure can be understood more fully by considering the operations described in the interaction process flow diagram of FIG. 2. As shown there, client 12 is depicted by a vertical line on the left-hand side of the figure, iDNS server 16 is depicted by a vertical line in the center of the figure, and DNS server 18 is depicted by a vertical line on the right-hand side of the figure.

Initially, at 203, an application running on client 12 generates a message intended for a network destination. The domain name for that destination is input in non-DNS compatible text encoding format. Thus, the text is encoded in a linguistic encoding type that digitally represents the characters of the text. As mentioned, ASCII is but one linguistic encoding type. In preferred embodiments, the invention handles a wide range of encoding types. Examples of some in wide use include GB2312, BIG5, Shift-JIS, EUC-JP, KSC5601, extended ASCII, and others.

After the client application creates the message at 203, the client operating system creates a DNS request to resolve the domain name at 205. The DNS request may resemble a conventional DNS request in most regards. However, the domain name provided in the request will be provided in a non-DNS encoding format. The client operating system transmits its DNS request to iDNS server 16 at 207. Note that the client operating system may be configured to send DNS requests to iDNS server 16. In other words, the default DNS server of client 12 is iDNS server 16.

The iDNS server 16 extracts the encoded domain name from the DNS request and generates a transformed DNS request presenting the domain name in a DNS compatible encoding format (presently the reduced set ASCII specified in RFC 1035). See 209. The iDNS server 16 then transmits its DNS request to conventional DNS name server 18. See 211. The name server then uses a conventional DNS protocol to obtain the IP address of the domain name used in the client's communication. See 213. Then, at 215, the name server replies to the iDNS server with the requested IP address. The iDNS server 16 then transmits the IP address back to client 12 at 217. Finally, client 12, with IP address now in hand, sends its communication to the intended destination. See 219.

As indicated above, the domain name must, at some point, be converted from a non-DNS encoding type to a DNS compatible encoding type. In the above examples, this is accomplished with a proxy iDNS server. This need not be the case, however, as the functionality necessary for conversion may be embodied in the client or the conventional DNS server, as well.

In alternative embodiments, the functions performed by the proxy iDNS server are implemented in whole (or in part) on the client and/or on the DNS server. In one embodiment, operations including detecting an encoding type, translating a non-DNS encoded domain to a DNS encoded domain name and identifying a default name server (operations 305–311 of the FIG. 3A flow chart discussed below) are implemented on an Internet application (e.g., a multilingual-enabled Web browser). In this embodiment, code detection and code conversion are automatically done prior to dispatching a DNS resolution request to a DNS server. In some embodiments, the application can provide manually defined linguistic encoding which obviates the need for code detection.

In another alternative embodiment, operations 305–311 can be implemented on the iDNS server. Other embodiments include collapsing all or some fraction of the operations of the proxy iDNS into the DNS server. For example, code for some iDNS functions can be collapsed into BIND code as a compilable module.

Figure 3A:
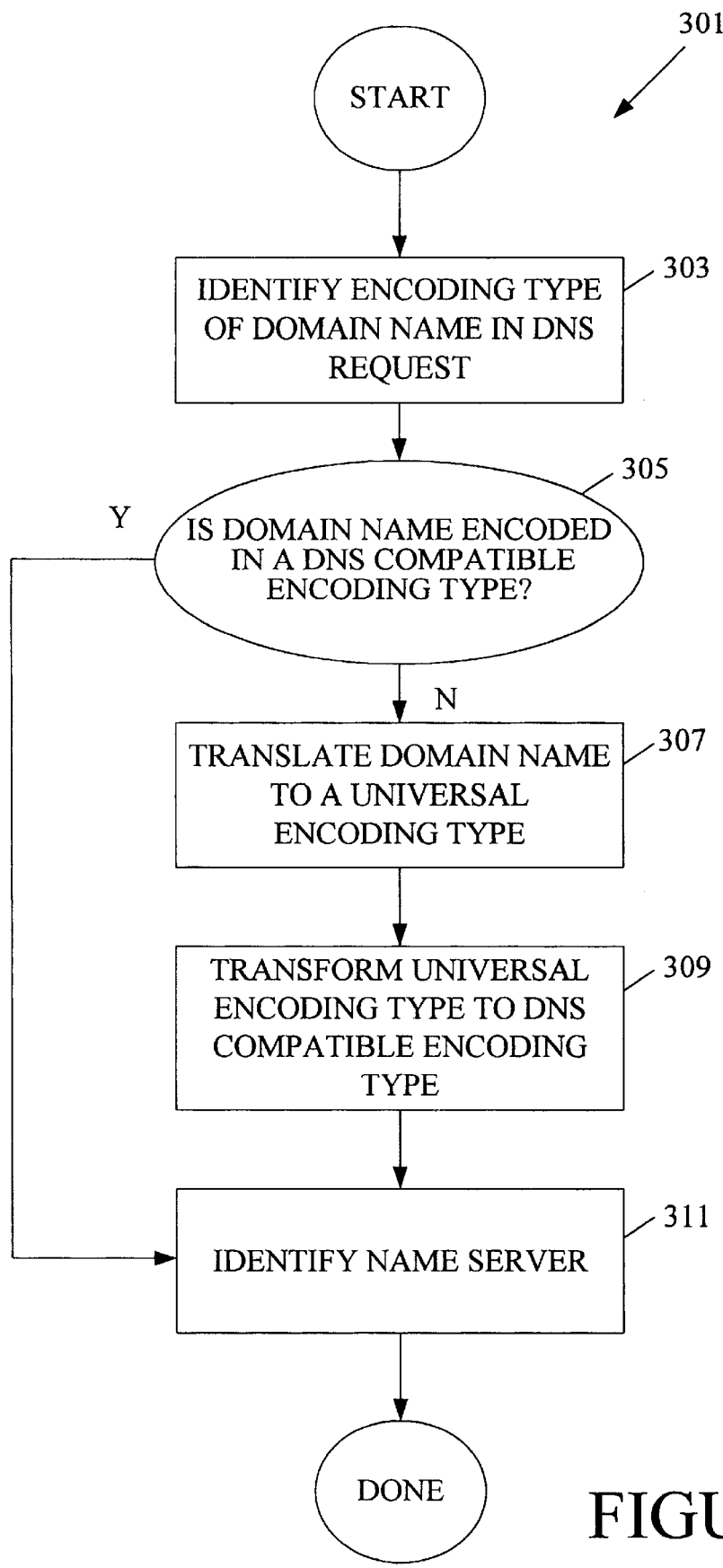
FIG. 3A is process flow diagram depicting a process for converting a Domain Name in a non-DNS encoding type to a corresponding Domain Name a DNS encoding type.

In FIG. 2, the conversion of the domain name from one linguistic encoding type to a second linguistic encoding type (compatible with DNS) is performed at 209. As shown in FIG. 3A, in accordance with a preferred embodiment of this invention, this conversion may take place via a process 301. The process begins at 303 with the system identifying the encoding type of the domain name in the DNS request. This is necessary when the system may be confronted with multiple different encoding types. After the encoding type has been identified, the system next determines whether the domain name was encoded in a DNS compatible encoding type at 305. Currently, that requires determining whether the domain name is encoded in the reduced set ASCII encoding type. If so, further conversion is unnecessary and process control is directed to 311, which will be described below.

In the interesting case, the domain name is encoded in a non-DNS format. When this occurs, process control is directed to 307 where the system translates the domain name to a universal encoding type. In a preferred embodiment, this universal encoding type is Unicode. In this case, the characters identified in the native encoding type are identified in the Unicode standard and converted to the Unicode digital sequences for those characters.

The newly translated domain name is then further transformed from the universal encoding type to a DNS compatible encoding type. See 309. Thus, this final encoding type may be reduced set ASCII. Note that the translation from the DNS incompatible format to the DNS compatible format takes place in two steps through an intermediate universal encoding type. This two step procedure will be detailed below. It should be understood, however, that it may be possible to directly convert, in one step, the DNS incompatible domain name to the DNS compatible domain name. This may be accomplished in a system having multiple conversion algorithms, each designed to convert a specific encoding type to ASCII (or some other future DNS-compatible encoding type). In one example, these algorithms may be modeled after the "Dürst algorithm" described above. Many other suitable algorithms are known or can be developed with routine effort.

With a DNS compatible domain name now in hand, the system need only determine which conventional DNS name server it should forward the domain name to. According to normal DNS protocol, the DNS request might be forwarded to a top-level name server. As will be described in more detail below, it may be convenient to have different root name servers handle different linguistic domains. For example, the Chinese government may maintain a root name server for Chinese language domain names, the Japanese government or a Japanese corporation may maintain a root name server for Japanese language domain names, the Indian government may maintain a root name server for Hindi language domain names, etc. In any event, the system must identify the appropriate name server at 311 as indicated in FIG. 3A. After this has been accomplished, the conversion process is complete and the DNS request can be transmitted to the DNS system for handling according to convention.

Preferably, the process depicted in FIG. 3A is performed solely on an iDNS server. However, some of the process may be performed on a client or a conventional DNS server. For example, 303 and 305 could be performed on a client and 309 could be performed on a conventional DNS server.

Figure 3B:
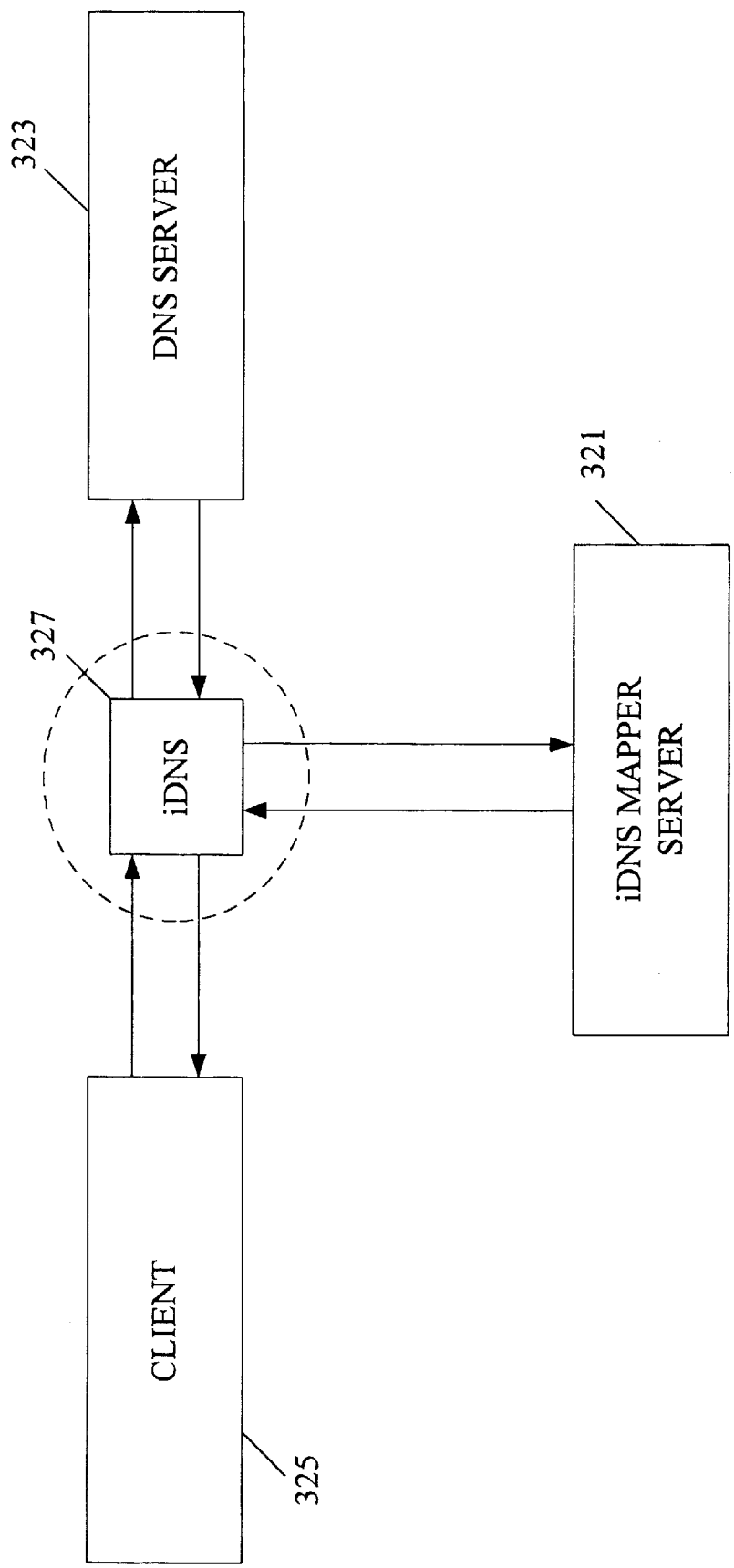
FIG. 3B is an illustration of the logical components of an iDNS system.

A preferred division of labor for the iDNS function (327) is depicted in FIG. 3B. As shown there, an iDNS mapper server 321 performs operations 305–311. To this end, it includes a mapping table (an example of which is described below with reference to FIG. 5) and can convert all linguistic encoding types to Unicode (or other suitable universal encoding type). In this embodiment, a client 325 performs operation 303 and a conventional DNS server 323 performs the standard DNS resolving protocol.

In one implementation iDNS mapper server 321 runs on a machine (identified by i2.i-dns.com for example) on a designated port (e.g., a port number 2000). It accepts a whole portion of a digitally represented domain name in any linguistic encoding type and returns a whole portion of a digitally represented domain name in Unicode transformed to a DNS encoding type (UTF-5). Note that the mapping table and the conversion program code may be quite large, thereby increasing the size of DNS server 323 several fold (if implemented there). By separating operations 305–311 from the DNS protocol and running it separately, the amount of code needed to distribute iDNS is reduced.

As indicated in the discussion of FIG. 3A, when the system must handle multiple encoding types, it must be capable of distinguishing one encoding type from the next. This process was depicted at block 303 and is elaborated on in FIG. 4.

Figure 4:
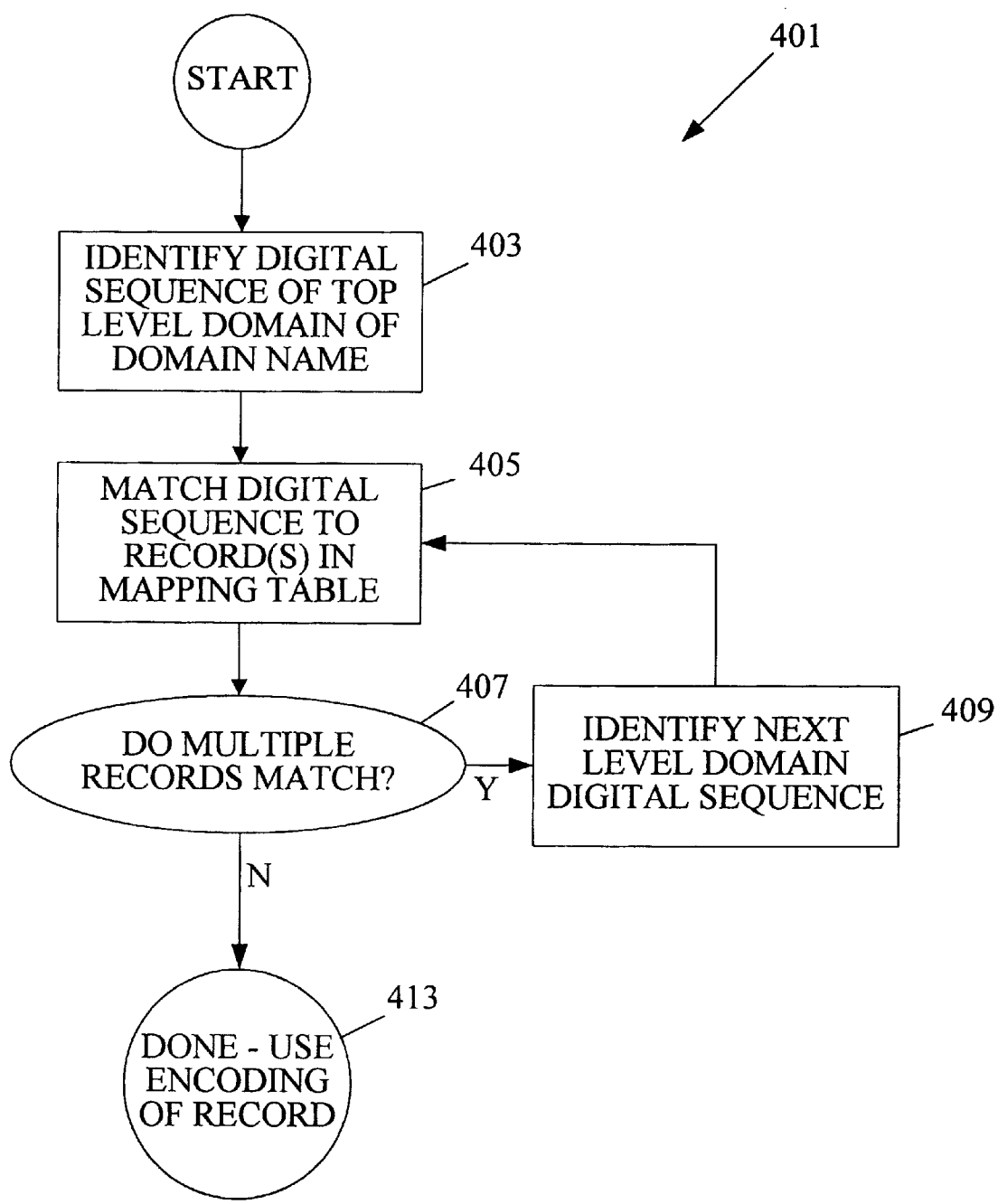
FIG. 4 is a process flow diagram depicting a process for determining the encoding type of a Domain Name.

As shown in FIG. 4, the process of identifying an encoding type 401 begins at 403 with the system identifying the digital sequence of the top-level domain of the domain name. In the system in place in March 1999, the top-level domains included .com, .edu, .gov, .mil, .org, .int, .net, and the various two letter country designations (e.g., .fr, .sg, .kr, etc.).

After the digital sequence of the top-level domain has been identified, the system next matches that sequence to a particular encoding type. In a preferred embodiment, this involves matching the sequence against records in a mapping table at 405. An exemplary mapping table will be described in more detail below. For now, simply recognize that the table (or other logical structure) includes a list of digital sequences for various top-level domains in the various linguistic encoding types handled by the system. Each separate record also includes an associated encoding type identifier. The system matches the digital sequence under consideration by simply comparing it against the sequences in the various records of the mapping table (using a standard database look up procedure such as a binary search, hash table, B-tree, etc.). This will typically provide a single match. However, if multiple entities are responsible for issuing top-level domains (each responsible for a different language, for example), then it is possible that the digital sequences for two top-level domains in different encoding formats could be identical.

To address this possibility, the system determines, at 407, whether multiple records match the digital sequence under consideration. If not, the process is complete at 413 with the system deciding to use the encoding identified in the single matching record. If, on the other hand, two or more records match, the system must resolve this ambiguity. It does this by first identifying a lower-level domain (e.g., a subdomain such as a second level domain) digital sequence. See 409. In other words, the domain name under consideration will have a digital sequence associated with its lower level domains. The now expanded digital sequence is again matched against the digital sequences in the mapping table (405). Note that some records of the table may include digital sequences for the combination of top-level and lower level domains (to resolve a potential ambiguity in the sequences of the top-level domains). After a match is found at 405, the process proceeds through 407 as described above.

In an alternative embodiment, only the digital sequences for top-level domains are maintained in the mapping table. No provision is made for extended sequences to resolve ambiguities. In this case, when 407 is answered in the affirmative (multiple records do match), the system identifies each of the potential matches (candidate encoding types). The sequence under consideration is then decoded using each of the potential encoding types. For example, the root domain digital sequence may have found a match for net in one of the Japanese encoding types and .com in one of the Chinese encoding types.

One of the decoded strings should be understandable in the language of the candidate encoding type. The other(s) should be gibberish. Thus, the system selects the candidate encoding type providing the best decoding of the secondary domain. The process is then concluded at 413 with the system using the selected encoding type.

As indicated at 405 in the discussion of FIG. 4, the iDNS server may match a digital sequence for a top-level domain of a domain name query against known digital sequences for multiple encoding types. A mapping table may house the known digital sequences. FIG. 5 provides a mapping table 501 in accordance with one embodiment of this invention. Each record in table 501 specifies a minimum code resolving string (e.g., a top-level domain) for a particular encoding type (e.g., .com for BIG5).

As shown, mapping table 501 includes six separate fields. The first of these is a time to live that specifies how long before the entry cache expires. Next, a minimum code resolving string field identifies the digital sequence of a portion of a domain name (e.g., the digital encoding for .com in BIG5). Note that the minimum code resolving string is typically provided as an 8 bit binary string. To simplify entry and maintenance of minimum code resolving strings in table 501, a transformation may be applied to the binary string in order to get the form shown.

While the minimum code resolving string may often be the top-level domain, this need not be the case. For some linguistic encodings, it may be necessary to include the second or a higher level domain to uniquely resolve the type of encoding given in the string because of an ambiguity. Similarly, it may not always be necessary to use the whole top-level domain to uniquely determine the encoding type. This speeds the search for a match.

The "authority" specified in the table is the entity given authority over domain names specified in the record. This authority can register sub-domains under its authority. For example, if an "i-dns" entity is given authority over .com in BIG5, it may have authority to issue all sub-domain names under .com in BIG5. This ensures that only unique domain names are assigned. Also, the authority denotes an entity having dominion over a name server (or servers) with "authoritative" records that provide IP addresses for domain names in the authority's portion of DNS space. The "encoding" field table 501 specifies the encoding type of the domain name matching the record. The "transform" field specifies the final encoding of the domain name. For example, UTF-5 is the Dürst algorithm applied to Unicode (described below). Finally, a "comments" field contains a text string identifying what the portion of a domain name corresponds to the minimum code resolving string.

Figure 6:
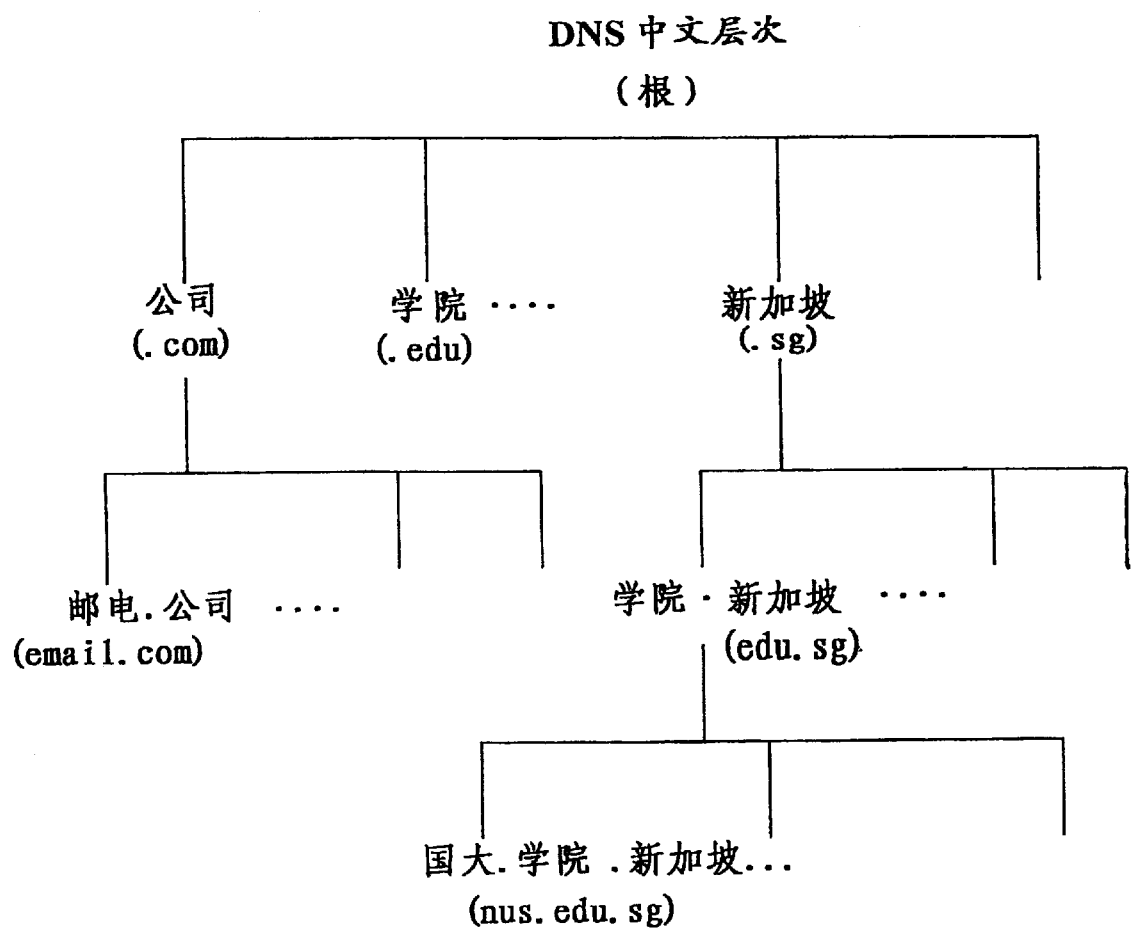
FIG. 6 is a "tree" diagram depicting a hierarchy of Chinese language encodings.

FIG. 6 illustrates an exemplary domain name tree for resolving Chinese language domain names. An iDNS server detecting a Chinese language encoding type, will be configured with default name servers for resolving a domain name. As shown in FIG. 6, under the root there are multiple top-level domains (e.g., .com, .edu, .sg, etc.). Under the .sg top-level domain, there are multiple Chinese language second-level domains such as edu.sg, and under that, there multiple domains including nus.edu.sg, and so on. Similarly, under the top-level .com, there are multiple second-level Chinese language sub-domains such as email.com.

As noted in the discussion of the embodiment of FIG. 3A, the iDNS system converts the universal encoding type (e.g., Unicode) of the domain name to a DNS encoding type. In one preferred embodiment, this is accomplished using a transformation algorithm defined by the Internet draft, "Internationalization of Domain Names", by Martin Dürst, previously incorporated by reference. The algorithm will transform a variable length data entity to a form that consists of only the RFC-compliant ASCII monocase alphabets and numbers. The table below shows the transformation table used in the Internet draft.

| | | Nibble Value | |
|---|---|---|---|
| Hex | Binary | Initial | Subsequent |
| 0 | 0000 | G | 0 |
| 1 | 0001 | H | 1 |
| 2 | 0010 | I | 2 |
| 3 | 0011 | J | 3 |
| 4 | 0100 | K | 4 |
| 5 | 0101 | L | 5 |
| 6 | 0110 | M | 6 |
| 7 | 0111 | N | 7 |
| 8 | 1000 | O | 8 |
| 9 | 1001 | P | 9 |
| A | 1010 | Q | A |
| B | 1011 | R | B |
| C | 1100 | S | C |
| D | 1101 | T | D |
| B | 1110 | U | E |
| F | 1111 | V | F |

The first two columns of the table are to be interpreted as binary (or hexadecimal) values while the last two columns are to be interpreted as the ASCII RFC1035-compliant characters. 'initial' and 'subsequent' means the initial nibble (half a byte) of the data entity and the rest of the data entity respectively. If the data entity is 2 bytes long (as in the case of UCS-2), then there will be 4 nibbles in that particular data entity.

As indicated in the above discussion, to resolve a multi-lingual domain name, a client application will submit the multilingual non-RFC-compliant query to an iDNS proxy server. This proxy server will then transform the query to an RFC-compliant format using this transformation algorithm and submit this query to a DNS server.

At the DNS server, there will be an entry for this RFC-compliant query that maps to a valid address such as:

U4B8O7E7RBB4U7BDP1.U696R0E5OAA0U59DQ1 IN A 12.34.56.78

The DNS server will then return this IP address in accordance to RFC1035 to the iDNS proxy server. The proxy will then relay the message containing the correctly resolved IP address to the client. Note that the transformed domain name (in ASCII) normally will have to be registered with the authority responsible for controlling and issuing conventional DNS domain names.

Embodiments of the present invention relate to an apparatus for performing the above-described iDNS operations. This apparatus may be specially constructed (designed) for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 7:
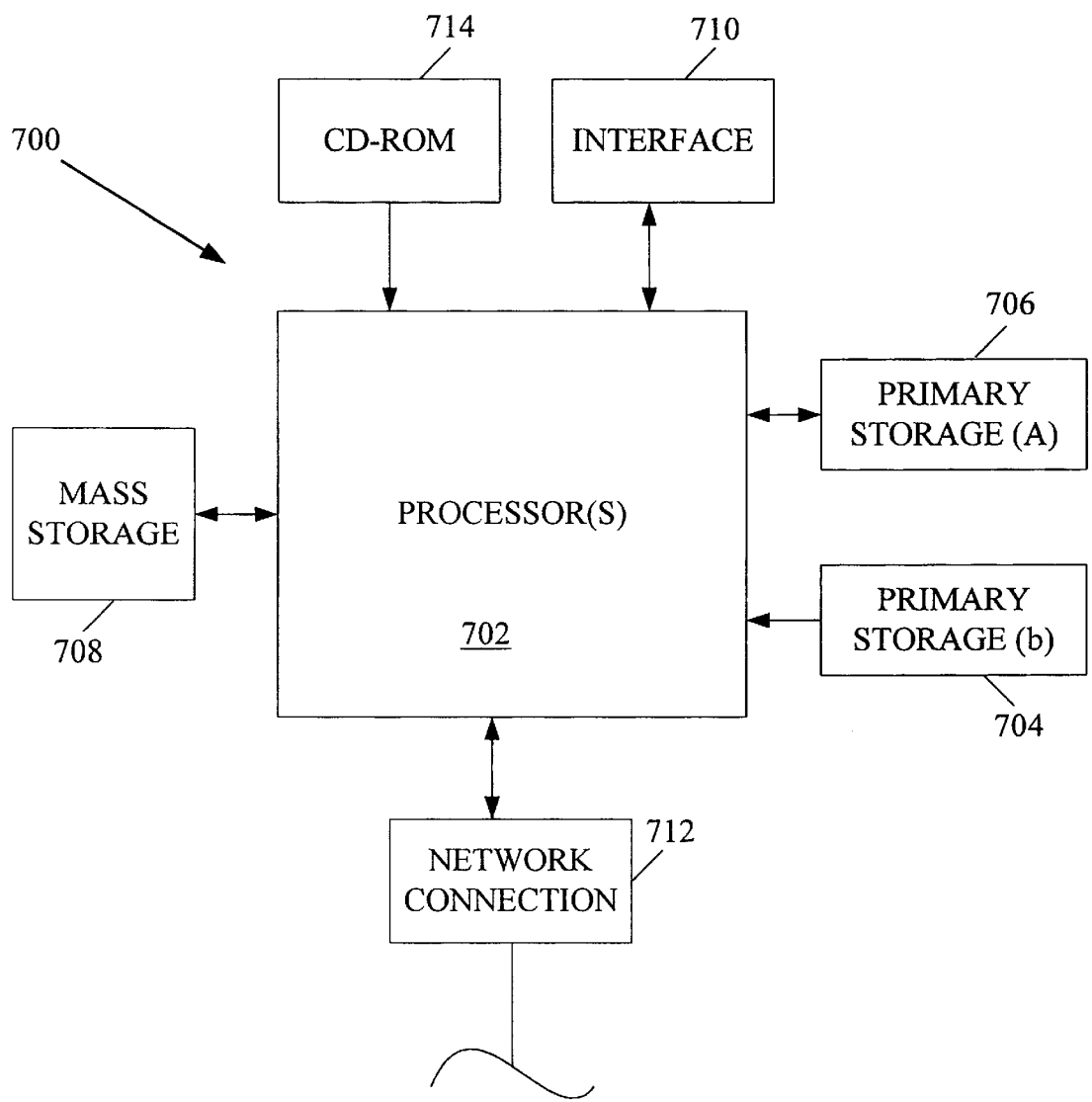
FIG. 7 is a block diagram of a general-purpose computer system that may be employed to implement iDNS functions of the present invention.

FIG. 7 illustrates a typical computer system in accordance with an embodiment of the present invention. The computer system 700 includes any number of processors 702 (also referred to as central processing units, or CPUs) that are coupled to storage devices including primary storage 706 (typically a random access memory, or "RAM"), primary storage 704 (typically a read only memory, or "ROM"). As is well known in the art, primary storage 704 acts to transfer data and instructions uni-directionally to the CPU and primary storage 706 is used typically to transfer data and instructions in a bi-directional manner. Both of these primary storage devices may include any suitable type of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

The hardware elements described above may be configured (usually temporarily) to act as one or more software modules for performing the operations of this invention. For example, instructions for detecting an encoding type, transforming that encoding type, and identifying a default name server may be stored on mass storage device 708 or 714 and executed on CPU 708 in conjunction with primary memory 706.

Although the foregoing invention has been described in some detail for purposes of clarity of understanding, it will be apparent that certain changes and modifications may be practiced within the scope of the appended claims.

What is claimed is:

1. A method, implemented on an apparatus, of detecting the linguistic encoding type of a digitally represented domain name, the method comprising:

receiving the digital sequence of a prespecified portion of the digitally represented domain name;

matching said digital sequence from the domain name with a known digital sequence from a collection of known digital sequences, each associated with a particular linguistic encoding type, and the collection including known digital sequences for at least two different linguistic encoding types; and identifying an encoding type associated with the known digital sequence matching the digital sequence from the domain name.

2. The method of claim 1, further comprising receiving a DNS request containing the digitally represented domain name.

3. The method of claim 1, wherein the prespecified portion of the digitally represented domain name is a minimum code resolving string in the domain name.

4. The method of claim 1, further comprising transforming the format of the digital sequence of the digitally represented domain name prior to matching that digital sequence.

5. The method of claim 1, wherein the collection of known digital sequences is provided in a table containing records having attributes including known digital sequences and encoding types.

6. The method of claim 5, wherein the table includes records having at least the following encoding types: ASCII, BIG5, GB2312, shift-JIS, EUC-JP, KSC5601, and extended ASCII.

7. The method of claim 5, wherein identifying the encoding type comprises identifying the encoding type of a record having the matching known digital sequence.

8. The method of claim 1, wherein at least two known digital sequences match the digital sequence from the domain name, and further comprising:

receiving the digital sequence of a second portion of the digitally represented domain name; and matching the digital sequence of the second portion with a known digital sequence from the collection of known digital sequences.

9. The method of claim 2, further comprising:

identifying a root level DNS server responsible for resolving root level domains of the identified encoding type; and transmitting the DNS request to the root level DNS server.

10. The method of claim 9, further comprising, prior to transmitting the DNS request, converting the domain name's digital sequence from the identified encoding type to a DNS encoding type compatible with DNS protocol.

11. The method of claim 10, wherein the DNS encoding type is ASCII or a universal linguistic encoding type.

12. The method of claim 10, wherein converting the domain name's digital sequence comprises:

converting the domain name's digital sequence from the identified encoding type to a universal linguistic encoding type; and converting the domain name's digital sequence from the universal linguistic encoding type to a DNS encoding type compatible with the DNS protocol.

13. A computer program product comprising a machine readable medium on which is provided program instructions for performing a method of detecting the linguistic encoding type of a digitally represented domain name, the method comprising:

receiving the digital sequence of a prespecified portion of the digitally represented domain name;

matching said digital sequence from the domain name with a known digital sequence from a collection of known digital sequences, each associated with a particular linguistic encoding type, and the collection including known digital sequences for at least two different linguistic encoding types; and identifying an encoding type associated with the known digital sequence matching the digital sequence from the domain name.

14. The computer program product of claim 13, wherein the collection of known digital sequences is provided in a table containing records having attributes including known digital sequences and encoding types.

15. The computer program product of claim 13, further comprising program instructions for the following:

receiving a DNS request containing the digitally represented domain name;

identifying a root level DNS server responsible for resolving root level domains of the identified encoding type; and transmitting the DNS request to the root level DNS server.

16. The computer program product of claim 15, further comprising program instructions for the following:

prior to transmitting the DNS request, converting the domain name's digital sequence from the identified encoding type to a DNS encoding type compatible with DNS protocol.

* * * * *